United States Patent
Puppe et al.

(10) Patent No.: US 9,685,754 B2
(45) Date of Patent: Jun. 20, 2017

(54) OPTICAL SCANNING (71) Applicant: TOPTICA Photonics AG, Grafelfing (DE)

(72) Inventors: Thomas A. Puppe, Munich (DE); Nico Vieweg, Stockdorf (DE); Armin Zach, Windach (DE); Alexander Sell, Friedrichshafen (DE)

(73) Assignee: TOPTICA PHOTONICS AG, Grafelfing (DE)

( * ) Notice: Subject to any disclaimer, the term of this patent is extended or adjusted under 35 U.S.C. 154(b) by 0 days.

(21) Appl. No.: 14/729,529

(22) Filed: Jun. 3, 2015

(65) Prior Publication Data
US 2015/0357788 A1    Dec. 10, 2015

(30) Foreign Application Priority Data

Jun. 5, 2014 (DE) .................. 10 2014 007 998
Jun. 1, 2015 (DE) .................. 10 2015 108 602

(51) Int. Cl.
*H01S 3/098* (2006.01)
*H01S 3/11* (2006.01)
(Continued)

(52) U.S. Cl.
CPC .............. *H01S 3/1106* (2013.01); *G01J 3/00* (2013.01); *H01S 3/067* (2013.01);
(Continued)

(58) Field of Classification Search
CPC ....... H01S 3/2383; H01S 3/067; H01S 3/1106
(Continued)

(56) References Cited

U.S. PATENT DOCUMENTS 7,957,435 B2 * 6/2011 Rausch ............ G01J 3/10
                                             372/25
2011/0085573 A1 * 4/2011 Bartels ............ H01S 3/1307
                                             372/25

FOREIGN PATENT DOCUMENTS

DE    102005050151 B3    11/2006
DE    202008009021 U1    11/2008
DE    102012113029 A1    6/2014

OTHER PUBLICATIONS

Jingbo Liu, Marx K. Mbonye, Rajind Mendis, and Daniel M. Mittleman, Measurement of Terahertz Pulses using Electronically Controlled Optical Sampling (ECOPS), Rice University, Department of Electrical and computer Engineering, 2 pages.

* cited by examiner

*Primary Examiner* — Tuan Nguyen
(74) *Attorney, Agent, or Firm* — Raymond R. Ferrera; Adams and Reese LLP (57) ABSTRACT

A device for generating temporally distant light pulses is provided, the device including at least a first light source for generating a first sequence of light pulses at a first repetition rate, and a second light source for generating a second sequence of light pulses at a second repetition rate. In some embodiments the device includes at least one actuator element which influences the first and/or the second repetition rate, and a control element which charges the actuator element with a periodical modulation signal for periodical variation of the first and/or second repetition rate. A control circuit is also provided including at least a phase detector, a corrective element, a control element, and a superposition element that forms an actuator signal from a modulation signal and an output signal of the control element, and which charges the actuator element with the actuator signal.

13 Claims, 4 Drawing Sheets (51) Int. Cl.
*H01S 3/067* (2006.01)
*G01J 3/00* (2006.01)
*H01S 3/10* (2006.01)
H01S 3/23 (2006.01)
H01S 3/08 (2006.01)
H01S 3/082 (2006.01)
H01S 3/107 (2006.01)
H01S 3/13 (2006.01)
H01S 3/136 (2006.01)

(52) U.S. Cl.
CPC ...... *H01S 3/10046* (2013.01); *H01S 3/06712* (2013.01); *H01S 3/082* (2013.01); *H01S 3/08054* (2013.01); *H01S 3/107* (2013.01); *H01S 3/1118* (2013.01); *H01S 3/1304* (2013.01); *H01S 3/136* (2013.01); *H01S 3/1307* (2013.01); *H01S 3/2383* (2013.01)

(58) Field of Classification Search
USPC .......................................................... 372/18
See application file for complete search history.

OPTICAL SCANNING

FIELD OF THE INVENTION

The present invention relates to a device for generating temporally distant light pulses, said device comprising
- a first light source generating a first sequence of light pulses at a first repetition rate,
- a second light source generating a second sequence of light pulses at a second repetition rate,
- at least one actuator element influencing the first and/or the second repetition rate, and
- a control element charging the actuator element with a periodical modulation signal for periodical variation of the first and/or the second repetition rate.

BACKGROUND OF THE INVENTION

Devices of this kind are used, for example, for ultra-fast time resolved spectroscopy. Mode-locked lasers are usually applied as light sources in this connection. So-called pump-probe techniques are used for measuring and investigating the time progression of physical or chemical processes. Such techniques have triggered remarkable progress in various fields of science and technology. Worth mentioning are studies on relaxation dynamics in solid-state bodies, liquids, and gases, as well as time-resolved terahertz spectroscopy and signal analysis in optical communications technology. In synchrotron radiation sources, mode-locked lasers are utilized as light pulse sources in order to control generating of electron bundles in terms of time and also to analyse the time-related behaviour of electron, UV-light or X-ray pulses. All these applications have in common that the arrival times of light pulses must be precisely controllable in an interactive center of the relevant experiment. In most cases, the arrival times and/or the time intervals between consecutively arriving light pulses must be variable within a certain interval in order to be able to scan the time progression of the physical, technical or chemical process to be investigated.

It is known to generate consecutive light pulses having an adjustable time interval by means of a single light source whose light beam is split into two partial beams and reunited again, with a delay distance of variable length being situated in one branch. The variable time interval between the light pulses according to this approach results from the different run-times in the branches fo such an interferometer. The variable length is usually realized by means of an electro-mechanically moved mirror. A disadvantage lies in that the mirror must be moved over the full way that corresponds to the variation of the time offset. This required large stroke conflicts with a fast movement of the mirror. Hence, the mirror movement is relatively slow and the time interval between light pulses can only be varied accordingly slowly. This entails undesirably long scanning times. Another disadvantage is that the mechanical mirror adjustment is susceptible to misadjustments. To define the time axis of a relevant experiment, the mirror position must be precisely determined for each value of the time offset. Moreover, due to divergency of the light beam, the mirror movement involves an undesired variation of the beam diameter.

To overcome these drawbacks, the so-called ASOPS technique has become known ("Asynchronous Optical Sampling"). According to this technique, two light sources are utilized which emit periodical sequences of light pulses, with the light pulse sequences being superimposed in the interactive center of the relevant experiment. The light pulse sequences of both light sources have a time offset that grows from light pulse to light pulse, and this time offset comes about due to the fact that the repetition frequencies of the light pulse sequences of the two light sources are slightly different. Accordingly, the time offset between the light pulses of the two light sources brushes over the full time interval between two consecutive light pulses from either light source, which means the complete time interval matching the inverse repetition frequency, until the light pulses of both light sources coincide again. Then the process starts all over again. Against this background it is a disadvantage that the scanning range of the ASOPS technique for most practical applications is much too large. The reasons is, as outlined above, that the time offset between consecutive light pulses constantly varies between zero and the full time interval between the light pulses of one of the light pulse sequences. For example, if the repetition frequency of light pulse sequences amounts to 100 MHz, the time offset of the light pulse sequences automatically varies between 0 and 10 ns. However, a scanning range of 10 ns is not needed in practice. For most applications, e.g. for time-resolved spectroscopy, a variable time offset of some 10 ps is absolutely sufficient in view of the time scale of the dynamics investigated. It means that with the ASOPS technique, no sensible measuring data can be obtained for the most part of the measuring period (over 90%). Consequently, the ASOPS technique has a significant disadvantage in that for generating light pulse sequences, one has to utilize light sources whose repetition rates at least amount to one gigahertz. Only in this way is it possible to achieve adequate time resolution with practical scanning rates at the same time for most applications.

Known from DE 20 2008 009 021 U1 is a device of the kind mentioned above, in which a control signal is formed within a control loop from the light pulse sequences by means of a phase detector, with the control loop comprising a controlling element that generates an actuating signal which influences the repetition rate of the light pulse sequence of either light source. By changing the repetition sequence, i.e. the reference variable, a rushing-ahead and/or trailing-behind of the light pulse sequence of the one light source versus the light pulse sequence of the other light source is generated in a well aimed manner. The controlling element sets the repetition rate such that the desired phase value, i.e. the desired time offset, is set. The prior art device has an advantage in that the time offset between the light pulse sequences can nearly arbitrarily be preset. The scanning range, i.e. the range over which the time offset is varied, e.g. in a pump-probe experiment, can be preset arbitrarily. This implies an advantage over the conventional ASOPS technique, in particular with regard to an adaptation of the scanning range to the requirements of a given application. The scanning range and the choice of measuring points, i.e. of the time offset values used in the measurement, are not defined and set by principle, but freely definable.

But controlling the repetition rate of either light source via the control circuit as per DE 20 2008 009 021 U1 also has some disadvantages. For example, the time resolution in varying the time offset is determined by the properties of the control loop. The scanning speed, i.e. the velocity in varying the time offset, is restricted by the bandwith of the control circuit. With fast pump-probe experiments (e.g. in time-resolved terahertz spectroscopy), a scanning speed in a range of 1 kHz is striven for, i.e. the entire scanning range is to be scanned periodically with this frequency. With such a high scanning speed, signal distortion in substantial extent occurs due to the properties of the control circuit. One result hereof is that the time axis of the experiment, i.e. the exact time interval between each single pump-and-probe light pulse cannot be reconstrued any longer precisely. In phase modulation according to the prior art approach, i.e. based upon two light pulse sequences coupled to each other via a phase control circuit, in other words, an undesired interaction occurs between modulating and controlling. The control circuit can follow a modulation of the reference variable only far below the control bandwidth. As modulation frequency and amplitude rise, signal distortion occur. Alternatively, if modulation is directly chirped on the actuator element, the control circuit tries to counteract it. Depending on modulation frequency, i.e. scanning speed, this happens with a different phase. The induced distortion of modulation varies from a counter-control. (below the control bandwidth of the control circuit) to co-modulation, i.e. an intensification of modulation above the bandwidth. In the transient range, controlling causes distortion of modulation which complicates reconstructing the relative phase and/or the relative time offset between the light pulses and thus the necessary calibration of the time axis of the relevant pump-probe experiment, or, depending on demanded accuracy, makes this even impossible. Another drawback lies in the fact that control with the prior art device may induce additional broadband disturbances due to the non-linear response from the control circuit or actuator element, which means that interfering harmonics of the modulation frequency or noise are generated.

BRIEF SUMMARY OF THE INVENTION

Now, against this background, it is the object of the present invention to provide an improved device for generating temporally distant light pulses.

This object is achieved by the invention, proceeding from a device of the kind described initially, by means of a control circuit comprising a phase detector which derives a control signal from the first light pulse sequence and the second light pulse sequence, a corrective element which derives a control deviation signal from the control signal and the modulation signal, and a controlling element, at the input of which the control deviation signal is pending, with the actuating element being charged with an actuating signal formed from the output signal of the controlling element.

In accordance with the present invention, the repetition rate of either light pulse sequence (or simultaneously of both light pulse sequences) is directly influenced. The actuating element influencing the repetition rate is directly charged with the periodically varying modulation signal so that undesired distortion due to an interswitched control which is proposed in prior art according to the afore-mentioned DE 20 2008 009 021 U1 is avoided. Thus, the present invention allows for a high scanning speed which in particular is not limited by the bandwidth of the phase control. Moreover, the invention allows for precisely calibrating the time axis, because conclusions can be drawn immediately from the modulation signal on the currently pending repetition rates and thereby on the time offset between the light pulses of the two light sources. According to the present invention, the time axis is not influenced by the control independent from the scanning speed.

The control circuit is inventively provided for ensuring stable phase coupling of the two light pulse trains. The control circuit comprises a phase detector which derives a controlling signal from the first light pulse sequence and the second light pulse sequence, a corrective element which derives a control deviation signal from the control signal and the modulation signal, and a control element at the input of which the control deviation signal is pending. The control element activates the actuator element. Preferably provided for this purpose is a superimposing element which superimposes the modulation signal and the output signal of the control element and which charges the actuating element with the actuating signal generated by the superimposition. The corrective element, in other words, takes the effect that the control deviation signal is compensated according to the modulation signal so that the control deviation signal is mainly liberated from the control signal modulation caused by the (fast) modulation of the repetition rate. The corrective element, in other words, corrects the control signal by the modulation before it is passed to the control element as control deviation signal. Then, the control deviation signal varies (in this extent deviating from the control concept according to the afore-cited DE 20 2008 009 021 U1) only within the control bandwidth of the control circuit, that means according to other disturbances of the relative phase situation of the two light pulse sequences (thermal drift, shakes, etc.). These slow disturbances are eliminated by charging the actuating element with the actuating signal formed from the output signal of the control element and from the modulation signal. In this approach, the control element remains non-influenced by the (fast) modulation of the repetition rate. Accordingly, no interaction occurs between modulating and controlling, and those disadvantages described before do not occur.

Inasmuch as the variation of the repetition rate according to the present invention is sufficiently small, so that the variation of the control signal at the output of the phase detector is smaller than a complete phase flank, compensation can be accomplished linearly by means of the corrective element. The corrective element may appropriately be an adder which adds the control signal and the modulation signal to form the control deviation signal. Preferably, on forming the control deviation signal, an adaptation of the phase and/or amplitude of the modulation signal is additionally accomplished by means of the corrective element. A more precise compensation can be generated based on an appropriate computation, e.g. by unfolding with the answer function of the phase detector. Optionally, the phase detector can be appropriately linearized so that the control signal depends linearly on the phase difference of the two light pulse sequences. A compensation by means of the corrective element can also be provided as a self-adaptive configuration. The amplitude and/or phase correction of the modulation signal in the combination with the control signal can be optimized for this purpose by means of an appropriate additional control, e.g. by minimizing temporal fluctuations of the control deviation signal in terms of frequency and amplitude, respectively. This allows for a flexible choice of the modulation frequency and amplitude of the repetition rate with automatic compensation in the control circuit.

In a preferred embodiment, the superimposition element, too, is an adder. Accordingly, the actuator element is charged with the actuator signal as a sum signal from the output signal of the control element and the modulation signal.

In principle, the modulation signal may be an arbitrary periodical time signal, which for instance is generated by means of a function generator, with the amplitude and/or frequency of the modulation signal being adjustable. By periodical variation of the modulation signal, the scanning range is periodically scanned in terms of time offset of the two light pulse sequences. The modulation signal, for example, may be a sinusoidal or even a rectangular signal. With a rectangular signal, the repetition rate is periodically switched to and fro between two preset values. Modulation by means of a rectangular signal allows for a temporally equidistant scanning, i.e. a temporally equidistant variation of the time interval of the two light pulse sequences, as well as for a precise reconstruction of the time axis.

For most applications of devices of the inventive kind, for example for fast resolved spectroscopy, a maximal time offset of the light pulse sequences of maximally 1 ns is sufficient. It is feasible without any problems to configure the inventive device in such a manner that the time offset amounts up to 1 ns. The time offset may also amount to noticeably smaller values of just a few 10 ps, so that the inventive device is ideally adaptable to the requirements of a relevant application. In particular this ensures that, as has been outlined above, sensible measuring values can be obtained during the entire measuring period. For example, when applying the inventive device to fast time-resolved spectroscopy, the scanning range can be adapted precisely to the time scale of the investigated dynamic processes.

Suitable for use as light sources for the inventive device are pulse lasers, more particularly mode-locked lasers. The inventive device can advantageously be realized with fiber lasers. In experiments, fiber laser systems based on erbium-doped fibers proved reliable. Such mode-locked fiber lasers which emit light pulse sequences at repetition frequencies in a range of 100 MHz are advantageously available commercially as prefabricated units. Such systems have turned out to be extremely robust. A significant advantage lies in the fact that the inventive device with mode-locked fiber lasers as light sources can be implemented for all those applications mentioned initially. Sophisticated, expensive and moreover adjustment-intensive titanium-sapphire lasers usually applied in ASOPS systems are not necessary for use as light sources for the inventive device.

For practical realization of the inventive device, the resonator length of the laser of the first and/or the second light source can be adjusted by means of the actuator element. The resonator length influences directly the repetition frequency of the light pulse sequence. The actuator element, for instance, may be a commercially available piezo translator that moves an end mirror of the laser resonator.

In accordance with another aspect of the present invention, the actuator element effects the changeover of the first repetition rate between two different, discrete values. As an alternative or supplementation thereto, the actuator element may effect the changeover of the second repetition rate between two different, discrete values. By applying this configuration, it is feasible to realize a method for generating temporally distant light pulses, said method comprising the following steps:
  generating a first sequence of light pulses with a first repetition reate by means of a pulse laser,
  generating a second sequence of light pulses with a second repetition rate by means of another pulse laser, and
  periodical changeover of at least one of the two repetition rates between two values, so that the pulse distance of the second light pulse sequence always deviates by a quantitatively predefined alternately positive and negative offset value from the pulse distance of the first light pulse sequence, wherein the changeover is accomplished by varying the polarization of the radiation circulating in at least one of the two pulse lasers between two different polarization statuses, and wherein a different active resonator length of the pulse laser is allocated to each of the polarization statuses.

This method makes use of the inherent short-term stability of the two light sources (lasers) so that a phase coupling by means of a phase control loop is not necessarily required. If required, a long-term stabilization of the repetition rates in a suitable manner may be purposive.

With the inventive method, the time offset between the light pulses of the two light sources initially rises incrementally (temporally linearly) due to the pulse distances differing by the offset value. For example, after having scanned 1000 measuring points within a predefined scanning range, the changeover is effected so that the offset between the pulse distances is inversed. It means, for example, that the second repetition rate which until the moment of changeover was greater than the first repetition rate, is accordingly smaller than the first repetition rate after the changeover. This can equally be achieved by varying the first, the second, or both repetition rate(s). After the changeover, the time offset between the light pulses of the two light sources again diminishes step by step so that a measurement with a decreasing time offset can accordingly be taken. For example, if a temporal coincidence of the light pulses of the first and the second light source is detected, a changeover of the repetition rate(s) is again effected so that the cycle can start all over again. Calibrating the time axis in this method is accordingly simple and precisely feasible.

With a preferred embodiment of the inventive device, the first and the second light source are lasers which have common components such as a common laser medium, a common optical fiber route and/or common mirrors. Utilizing common components makes a cost-effective realization possible. Moreover, a utilization of common components increases system stability, because external influences (whether of a thermal or a mechanical type) take equal effect on common components and thus on both lasers. The two lasers, despite their common components, remain independent, for example since radiation from the first laser is polarized orthogonally to the radiation from the second laser. Thus, radiations from both lasers do not interact.

Inventively used as actuator element is a polarization modulator. In accordance with the present invention, a repetition rate is allocated to each of the two pulse lasers, and this repetition rate can easily and with the shortest switching time (i.e. during the time between two consecutive light pulses of the relevant light pulse sequence) be changed over inventively between one of two discrete values by periodically varying the polarization status of the radiation circulating in the resonator of the laser by means of the polarization modulator. Usable as polarization modulator, for example, is an electro-optical modulator (EOM).

In the configuration in which both lasers share common components, a "swap" of the repetition rates of both light sources can take place so to speak alternately by reversing the polarization rotation To realize two different repetition rate values, with one each of the two repetition rate values being allocated to each of the two polarization statuses, a double-refractive element can be utilized. On account of the refractive index being different depending on the polarization direction (and on account of the different optical path lengths), it results a different effective resonator length and thus a (slightly) different repetition rate.

Likewise, the first and/or the second light source may have a polarization beam splitter which splits the radiation from the relevant light source to two (differently long) branches of an interferometer in accordance with the relevant polarization status.

BRIEF DESCRIPTION OF THE SEVERAL VIEWS OF THE DRAWINGS

Practical examples of the present invention are explained in greater detail in the following by way of drawings, where.

DETAILED DESCRIPTION OF THE INVENTION

Figure 1:
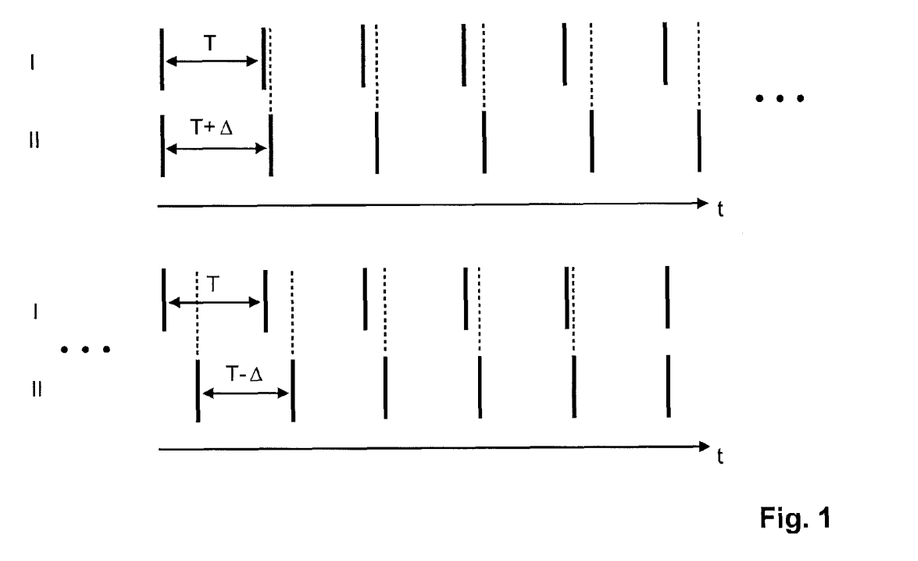
FIG. 1 illustrates temporally staggered light pulse sequences with a variation of the repetition rate according to the invention.

The diagram of FIG. 1 illustrates a first sequence of temporally equidistant light pulses I and a second sequence of temporally equidistant light pulses II on the time axis t. The light pulses are each symbolized by a continuous vertical bar. The dashed vertical lines show the points of time of the light pulses of the second sequence II in order to highlight the relative temporal position of the light pulses of the first sequence I and of the second sequence II. The pulse distance T of the light pulses of the first sequence I, for example, amounts to T=12.5 ns (corresponding to a repetition rate of 80 MHz). During a first time interval (upper diagram), the pulse distance of the light pulses of the second sequence II, for example, is by Δ=100 fs greater than T. The distance between the light pulses of the first sequence I and the light pulses of the second sequence II accordingly rises from pulse pair to pulse pair by 100 fs each. This occurs over 1000 light pulses, for example, until the distance between consecutive light pulses of the first and second sequence I and/or II amounts to 100 ps. Then, the repetition rate of the second light pulse sequence is changed over (lower diagram), so that the pulse distance of the light pulses of the second sequence II now amounts to T−Δ. The pulse distance now diminishes by 100 fs from pulse pair to pulse pair until, again after 1000 light pulses, the light pulses are generated simultaneously (last pulse pair in the diagram at the bottom right). At this point, the repetition rate of the second light pulse sequence is switched back to the original value so that the pulse distance of the light pulses of the second sequence II again amounts to T+Δ and the procedure outlined above starts all over again. It should be noted that the cycle need not be passed through necessarily in a way that the light pulses of the two sequences I and II each coincide at the beginning and/or at the end of the cycle. The minimal and maximal temporal distance between which it is varied can be predefined in principle arbitrarily according to the present invention.

Figure 2:
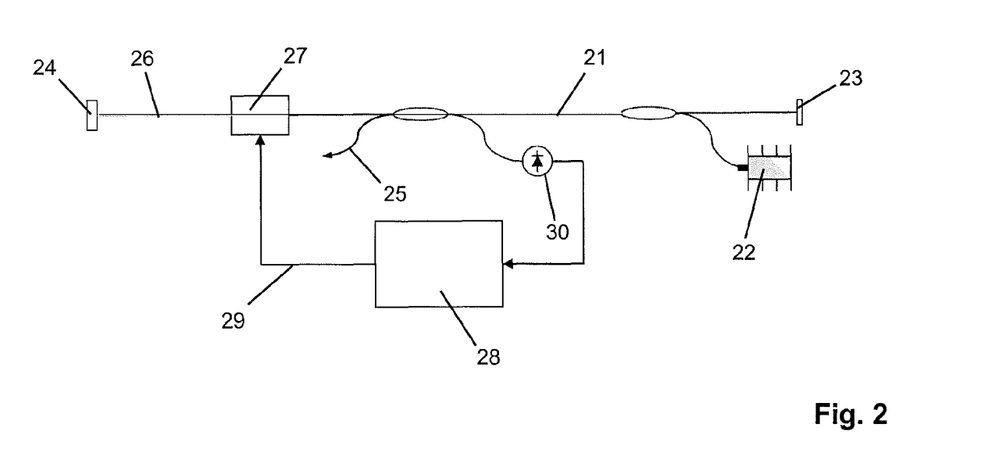
FIG. 2 shows an inventive device in a first embodiment as a block-type diagram.

FIG. 2 shows an inventive device in which a first and a second light source are realized in form of mode-locked fiber lasers, wherein the two light sources have common components for maximal exploitation of a common mode, that means a laser medium 21 in form of a fiber doped with erbium ions which is optically pumped by a laser diode 22, and comprising an end mirror of the laser resonator in form of a saturable absorber mirror (SESAM) 23, which simultaneously acts as a passive mode-coupling element, and another end mirror 24 of the laser resonator. The radiation from the second light source has a polarization that is orthogonal to the radiation of the first light source, so that the radiations of both light sources are not interactive. The radiation generated is decoupled at 25. In accordance with the invention, the first light source generates the first sequence I of light pulses at the first repetition rate, whereas the second light source generates the second sequence II of light pulses at the second repetition rate. Provided for this purpose is a double-refractive fiber 26 which effects a different effective resonator length of the first and of the second light source. Provided for as actuator element 27 is a polarization modulator in form of a fiber-coupled EOM. By varying the rotation of the polarization direction, it influences the first and the second repetition rate in such a manner that the repetition rates of both light pulse sequences are swapped. A control element 28 charges the actuator element 27 directly with a periodical modulation signal 29 in order to periodically vary the pulse distances of the light pulses accordingly. A photo diode 30 detects the light pulses generated so that the repetition rate is changed over for instance every 1000 light pulses. The individual fiber sections of the device illustrated should be configured as polarization maintaining versions so that the light pulses of both light sources at all points in the resonator are separated over the polarization status and are not interactive.

It should be noted that avoidance of interaction of light pulses from both light sources is necessarily not only achievable by way of polarization being orthogonal to each other. In an alternative embodiment, two light pulses can circulate spatially one behind the other in a ring-shaped resonator without coinciding, with it being possible to selectively modulate the circulating time of each light pulse by way of suitable switchable optical elements so that the time distance of the circulating light pulses is enhanced and/or lessened.

Figure 3:
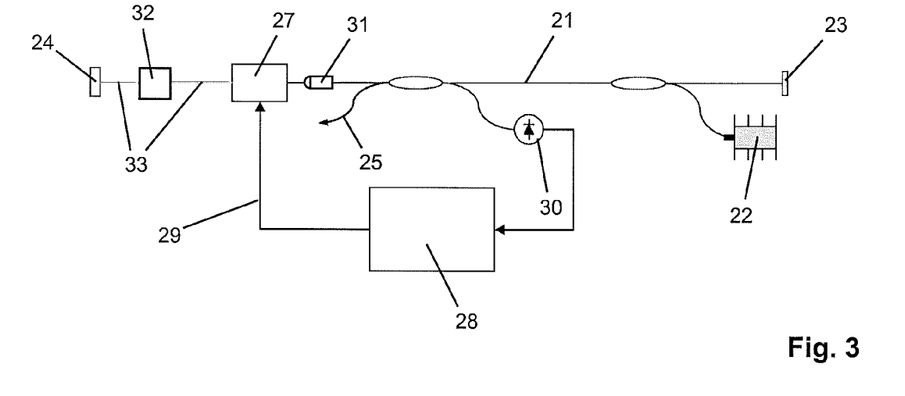
FIG. 3 shows the inventive device in a second embodiment as a block-type diagram.

The practical example of FIG. 2 is completely fiber-based. Conversely, with the practical examples shown in FIGS. 3 and 4, part of the resonator is arranged as a free-beam configuration. Via a fiber coupler 31, the radiation is fed to one EOM each as actuator element 27 in a free beam. With the practical example shown in FIG. 3, a double-refractive crystal 32 (e.g. $YVO_4$) in a free-beam path 33 is provided for to generate the different effective resonator lengths in the orthogonal polarization directions. With the practical example shown in FIG. 4, a polarization beam splitter 41 is used that splits the radiation according to the relevant polarization to the two shown differently long arms of an interferometer. The further end mirror is designated with 24'. The photo diode 30 in turn detects the light pulses generated. In a feasible configuration, it can be utilized for detecting a temporal coincidence of the generated light pulses of the first and the second sequence I and II, respectively, in order to synchronize the variation of repetition rates on this basis and to calibrate the time axis with utmost precision at the same time. For example, a 2-photon photo diode can be utilized for this purpose.

Figure 5:
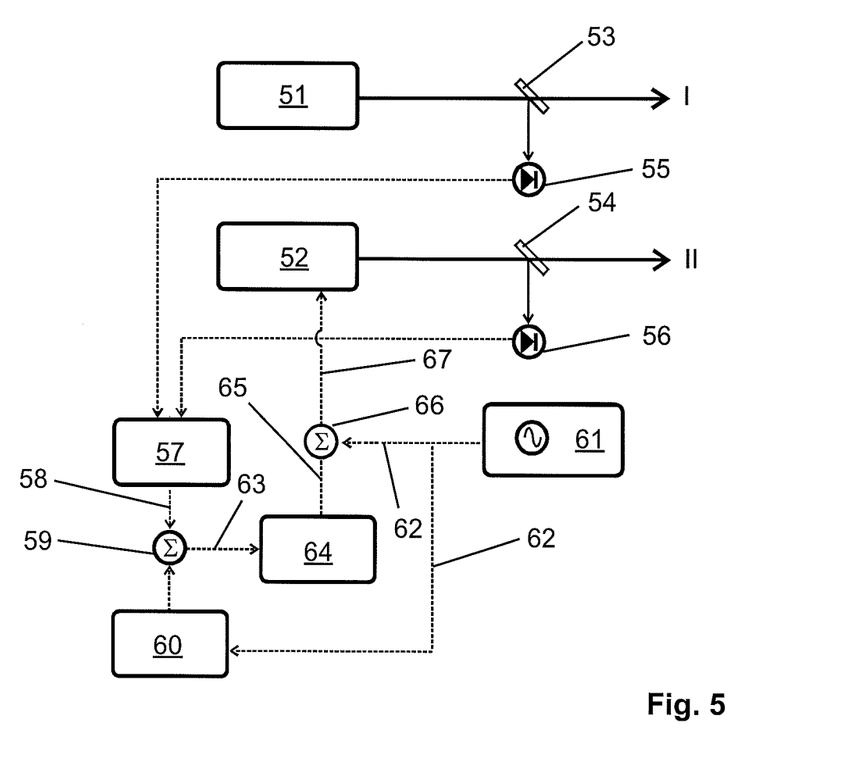
FIG. 5 shows the inventive device in a fourth embodiment as a block-type diagram.

The device as per FIG. 5 comprises two separate mode-locked fiber lasers 51 and 52 as light sources for generating the light pulse sequences I and II. Via a beam splitter 53 and 54, part of the laser light of the light pulse sequences I and II is carried to photo diodes 55 and 56, respectively. The signals generated by photo diodes 55 and 56 are passed to a phase detector (e.g. mixer) 57. Arranged upstream of the phase detector 57 may be filters (not shown here) which filtrate the signal portions at harmonics of the repetition rates of the light pulse sequences I and II. Likewise, phase shifters (not shown here) may be arranged upstream of the phase detector 57. At its output, the phase detector 57 generates a control signal 58. An adder 59 and an amplitude setter 60 form a corrective element in the sense of the present invention which derives a control deviation signal 63 from the control signal 58 and a modulation signal 62, here sinusoidal, generated by means of a control element (function generator) 61. The corrective element takes the effect that the control deviation signal 63 is mainly liberated from a (possibly quick) modulation of the control signal 58. The control deviation signal 63 varies within the control bandwidth of the control loop. The control deviation signal 63 is pending at the input of a PID controller. The latter generates an output signal 65 which is superimposed by means of a superposition element (another adder) 66 with the modulation signal 62 and passed on to an actuator element (not shown more closely in FIG. 5) of the fiber laser 52. The actuator signal 67 generated by superimposition acts on the repetition rate of the light pulse sequence II emitted by fiber laser 52. To this end, the actuator signal 67, for example, activates a piezo translator integrated in fiber laser 52 by means of which the resonator length of fiber laser 52 is adjusted. By means of the corrective element which in this practical example is comprised of the adder 59 and the amplitude setter 60, the control circuit remains non-influenced by the (quick) modulation of the repetition rate corresponding to modulation signal 62. Accordingly, no interaction occurs between modulating and controlling, and adverse distortions resulting thereof are avoided. The frequency of the modulation signal 62 determines the scanning frequency of the device, i.e. the frequency by which the time offset varies periodically between the light pulse sequences I and II. The amplitude of the modulation signal 62 which is freely adjustable by means of function generator 61 determines the width of the scan range in terms of the time offset.

It should be noted that the components of the control circuit shown in FIG. 5 (function generator, adder, phase setter, controller, superposition element, control element, etc.) can be realized by discrete electronic components or also by implementation through a software, e.g. in a microcontroller or a signal processor.

Figure 4:
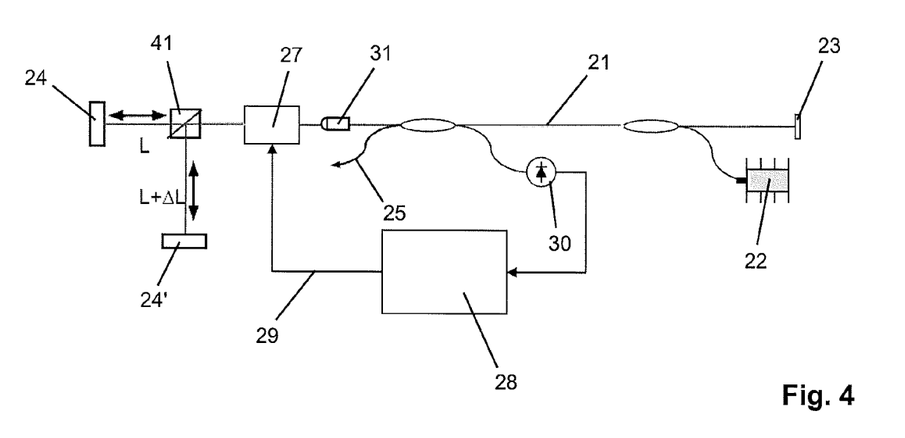
FIG. 4 shows the inventive device in a third embodiment as as block-type diagram.
Figure 6:
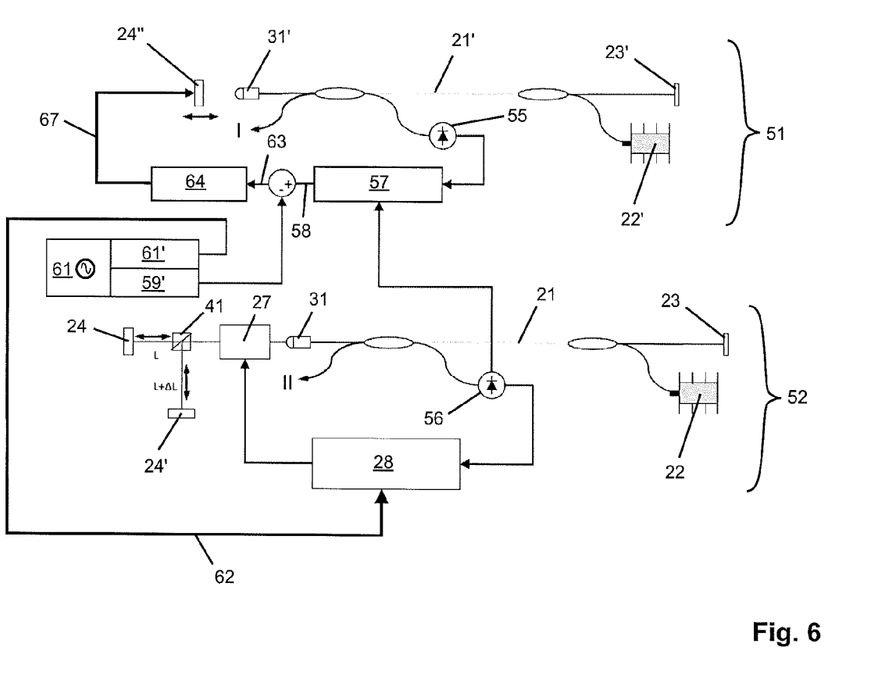
FIG. 6 shows the inventive device in a fifth embodiment as a block-type diagram.

With the alternative embodiment shown in FIG. 6, the function generator 61 at its output 61' generates a modulation signal 62, so that the repetition rate of the light source 52 configured as a pulse laser is changed over periodically between two discrete values. Similarly to what is shown in FIG. 4, the pulse laser 52 is equipped with an actuator element 27 in form of an EOM for generating different effective resonator lengths via the polarization status of the radiation circulating in the laser resonator. The pulse distance of the second light pulse sequence II then constantly deviates by an alternately positive and negative offset value from the pulse distance of the first light pulse sequence I, this offset value being quantitatively predefined by the resonator length difference $\Delta L$. To achieve in this case that the control circuit is not influenced by the modulation of the repetition rate, an output 59' instead of the adder 59 is used at which a triangular signal is pending that is derived from the modulation signal (e.g. by way of temporal integration). In the control circuit, the alternately rising and falling triangular signal compensates the alternately linearly rising and/or falling phase difference of the light pulse sequences I and II (see FIG. 1) which is generated by the rectangular modulation of the repetition rate of light source 52. Directly pending at the output of controller 64 is the actuator signal 67 which activates a piezo translator (not shown here) which in turn moves an end mirror 24" of the laser resonator of the pulse laser forming the light source 51. With the practical example shown in FIG. 6, the phase coupling of the two light sources 51, 52 is established in this manner.

In FIG. 6, the pulse laser 51 like pulse laser 52 is a mode-locked fiber laser. In contrast with FIGS. 2 to 4, however, the two lasers 51, 52 do not share any common components, but they are realized as separate units. The pulse laser 51 comprises a laser medium 21' in form of an erbium ion doped fiber which is optically pumped by a laser diode 22', an end mirror of the laser resonator in form of a saturable absorber mirror (SESAM) 23' which at the same time acts as a passive mode-coupling element, and the end mirror 24" of the laser resonator. Via a fiber coupler 31', the radiation is passed to the movable end mirror 24". The first light source 51 generates the first sequence I of light pulses at the first repetition rate, whereas the second light source 52 generates the second sequence II of light pulses at the second repetition rate.

The invention claimed is:

1. A device for generating temporally distant light pulses, said device comprising a first light source (51) generating a first sequence (I) of light pulses at a first repetition rate, a second light source (52) generating a second sequence (II) of light pulses at a second repetition rate, at least one actuator element influencing the first and/or the second repetition rate, and a control element (61) charging the actuator element with a periodical modulation signal (62) for periodical variation of the first and/or the second repetition rate, characterized by a phase detector (57) which derives a control signal (58) from the first light pulse sequence (I) and the second light pulse sequence (II), a corrective element (59, 60) which derives a control deviation signal (63) from the control signal (58) and the modulation signal (62), and a control element (64) at the input of which the control deviation signal (63) is pending, with the actuator element being charged with an actuator signal (67) formed from the output signal (65) of the control element (64).

2. The device according to claim 1, characterized by a superposition element (66) which forms the actuator signal (67) from the modulation signal (62) and the output signal (65) of the control element (64) and which charges the actuator element with the actuator signal (67).

3. A device for generating temporally distant light pulses, said device comprising a first light source (51) generating a first sequence (I) of light pulses at a first repetition rate, a second light source (52) generating a second sequence (II) of light pulses at a second repetition rate, at least one actuator element influencing the first and/or the second repetition rate, and a control element (61) charging the actuator element with a periodical modulation signal (62) for periodical variation of the first and/or the second repetition rate, in particular according to claim 1 or 2, characterized in that the actuator element effects a changeover of at least one of the repetition rates between two different discrete values, with the actuator element being a polarization modulator (27).

4. The device according to any of the preceding claims 1 to 3, characterized in that the first and/or the second light source (51, 52) each comprise a pulse laser.

5. The device according to claim 4, characterized in that the actuator element adjusts the effective resonator length of the pulse laser.

6. The device according to claim 5, characterized in that the effective resonator length of the pulse laser is different depending on the polarization status of the radiation circulating in the resonator of the pulse laser.

7. The device according to any of the preceding claims 1 to 6, characterized in that the modulation signal (62) is a sinusoidal signal or a rectangular signal.

8. The device according to any of the preceding claims 1 to 7, characterized in that the first light pulse sequence (I) and the second light pulse sequence (II) have a periodically varying time offset which amounts up to 1 ns.

9. The device according to any of the preceding claims 1 to 8, characterized in that the first and the second light source are lasers which comprise common components such as a common laser medium (21), a common optical fiber route and/or common mirrors (23, 24).

10. The device according to any of the preceding claims 1 to 9, characterized in that the radiation of the second light source has a polarization which is orthogonal to the radiation of the first light source.

11. The device according to any of the preceding claims 1 to 10, characterized in that the first and/or the second light source comprise a double-refractive element (26, 32).

12. The device according to any of the preceding claims 1 to 11, characterized in that the first and/or second light source comprise a polarization beam splitter (41) which splits the radiation of the first and/or second light source corresponding to the relevant polarization to two arms of an interferometer.

13. A method for generating temporally distant light pulses, said method comprising the following steps: generating a first sequence (I) of light pulses at a first repetition rate by means of a pulse laser, generating a second sequence (II) of light pulses at a second repetition rate by means of another pulse laser, and periodical changeover of at least one of the two repetition rates between two values so that the pulse distance of the second light pulse sequence constantly deviates by a quantitatively predefined alternately positive and negative offset value from the pulse distance of the first light pulse sequence, with the changeover being effected by varying the polarization of the radiation circulating in the resonator of at least one of the two pulse lasers between two different polarization statuses, and wherein a different effective resonator length of the pulse laser is allocated to each of the polarization statuses.

* * * * *